United States Patent [19]

Brears

[11] Patent Number: 4,800,286

[45] Date of Patent: Jan. 24, 1989

[54] MEASUREMENT OF VARIATION IN FLUTE PROFILE HEIGHT

[75] Inventor: John H. Brears, North Vancouver, Canada

[73] Assignee: MacMillan Bloedel Limited

[21] Appl. No.: 83,647

[22] Filed: Aug. 10, 1987

[51] Int. Cl.$^4$ ............................................. G01N 21/86
[52] U.S. Cl. ...................................... 250/560; 250/227
[58] Field of Search ........... 250/560, 561, 227, 231 R; 356/376, 381, 429, 430

[56] References Cited

U.S. PATENT DOCUMENTS

| | | | |
|---|---|---|---|
| 4,254,331 | 3/1981 | Dorman et al. | 250/227 |
| 4,547,668 | 10/1985 | Tsikos | 250/227 |
| 4,550,377 | 10/1985 | Craemer | 250/571 |
| 4,572,949 | 2/1986 | Bowers | 250/227 |
| 4,599,711 | 7/1986 | Cuomo | 250/227 |
| 4,617,460 | 10/1986 | Tokunaga et al. | 250/227 |
| 4,652,744 | 3/1987 | Bowers | 250/227 |
| 4,701,610 | 10/1987 | Hoogenboom | 250/231 R |
| 4,701,611 | 10/1987 | Kissinger | 250/231 R |

OTHER PUBLICATIONS

E. Schoene et al., "French Development Provides Continuous High/Low Measurement", Oct. 1983, pp. 35–46.

Primary Examiner—David C. Nelms
Assistant Examiner—Stephone B. Allen
Attorney, Agent, or Firm—C. A. Rowley

[57] ABSTRACT

Method and apparatus for determining the variation in the height of flute profile for corrugated material is obtained by passing the corrugated material in a predetermined space relationship across a beam of light projected toward the corrugated material in a direction substantially perpendicular to the flute tips and the bases of the valleys of the corrugated material and collecting the light reflected back directly from the material, i.e. in a direction substantially parallel to the light beam, determining the amount of light reflected back from each flute tip of the corrugated material to provide an indication of flute height.

11 Claims, 6 Drawing Sheets

MEASUREMENT OF VARIATION IN FLUTE PROFILE HEIGHT

FIELD OF INVENTION

Present invention relates to measurement of flute height and flute height variation in corrugated material. More particularly, the present invention relates to a system for continuous on-line flute measurement.

BACKGROUND OF THE PRESENT INVENTION

The invention will primarily be described in relation to corrugating medium used in making corrugated board as used in the manufacture of, for example corrugated containers.

As is well known, it is very important to maintain consistently well formed flutes to ensure the proper adhesion of single face and double face liners to ensure the board produced will have the proper strength and aesthetic characteristics.

It will be apparent that it is important to be able to understand and/or analyze the flute profile, particularly, flute height, on-line during operation so that immediate steps may be taken to rectify any significant problems that are detected. It is the height of the flute and/or variation in height of the flute that determines many of the final characteristics of the board.

A method for off-line inspection of flute profile, particularly variation in flute height is simply an examination of the produced board visually for defects such as high-low flutes and caliper. These measurements are subjective and are made on the final combined board leaving the line. Thus variation of the flute profile of the corrugated medium in the single face is masked by the combination with the double face liner.

It is also known to slit the board across the corrugations, i.e. through one liner and the corrugated medium and fold the board back on itself by creasing the opposite liner and then visually compare the successive flutes so exposed.

Certain off-line tests may also be used such as iodine stain applied to the glue line after separating the liner from the medium to show irregularity in the glue line, strength measurements on the combined box board, overall appearance (e.g. blisters) and finished print quality.

More recently, on-line devices have been attempted, for example devices contacting the fluted medium exiting the corrugator roll to roll nip have been used in lab corrugators to try to determine flute heights and variations thereof.

One technique, known to the trade is the "CTP" technique wherein a collimated light beam is passed tangentially across the flute tips of single face passing over a roller. This technique has been used on a laboratory corrugator and is not particularly suitable for high speed operations since the single face must be bent around a relatively small diameter roll in order that the individual flute tips can interrupt the collimated light beam. This device also gives no indication of flute depth and it is possible that medium surface roughness could effect the results. This device is described by Schoene, E. and Serre, J., "French Development Provides Continuous High/Low Measurement", Boxboard Containers, p 35-46 (Oct. 1983).

Another technique known as the IPC technique is suitable for slow, detailed analysis of flute profile variations which permits precise measurement of variation from point to point along the profile. A laser beam is projected at a first angle toward the flutes of the corrugated medium and the light reflected at an acute angle to the laser beam is collected. This device to date is limited to relatively low speed laboratory testing and has not been used commercially on-line due to stringent mounting requirements.

BRIEF DESCRIPTION OF THE PRESENT INVENTION

It is an object of the present invention to provide a device for determining rapidly (real time analysis) variation in height of corrugations in a corrugated material.

More particularly it is an object of the invention to provide equipment that may be used to continuously monitor flute heights at full machine speed on-machine as the corrugated boxboard is being produced.

The present invention relates to a method and apparatus for determining the variation in heights of the flutes of a corrugated material comprising passing the corrugated material in predetermined spaced relationship past a beam of light projected towards said corrugated material, said beam of light being directed substantially perpendicular to the flute tips and the base of each valleys of said corrugated material as said peaks and troughs traverse said beam of light, collecting light reflected back from said corrugated material in a direction substantially parallel to said beam via a lens collector, determining the maxima of said collected reflected light to provide a series of maxima the values of which are representative of the height the flute tips of the corrugated material.

Preferably both the maxima indicative of flute tip height (positive maxima) and the maxima indicative of flute valley depth (negative maxima) are sensed and the two values are processed and compared electronically to determine flute height.

Preferably the light used will be infrared light generated by a photo emitter and transmitted via fiber optics to a lens which projects said light onto said corrugated material and collects the light reflected back to the lens. The collected light is transmitted back through the fiber optics through a bifurication to a photo diode receiver.

It is also preferred that the corrugated material pass over a reference surface spaced a preset distance from said lens collector and that one side of the material to be measured be in contact with the reference surface to provide a reference plane locating one side of the corrugated material a specific distance from the lens collector when the flute heights are being measured.

In a normal arrangement of the present invention, the collector and light beam will both be operative through a single lens structure.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
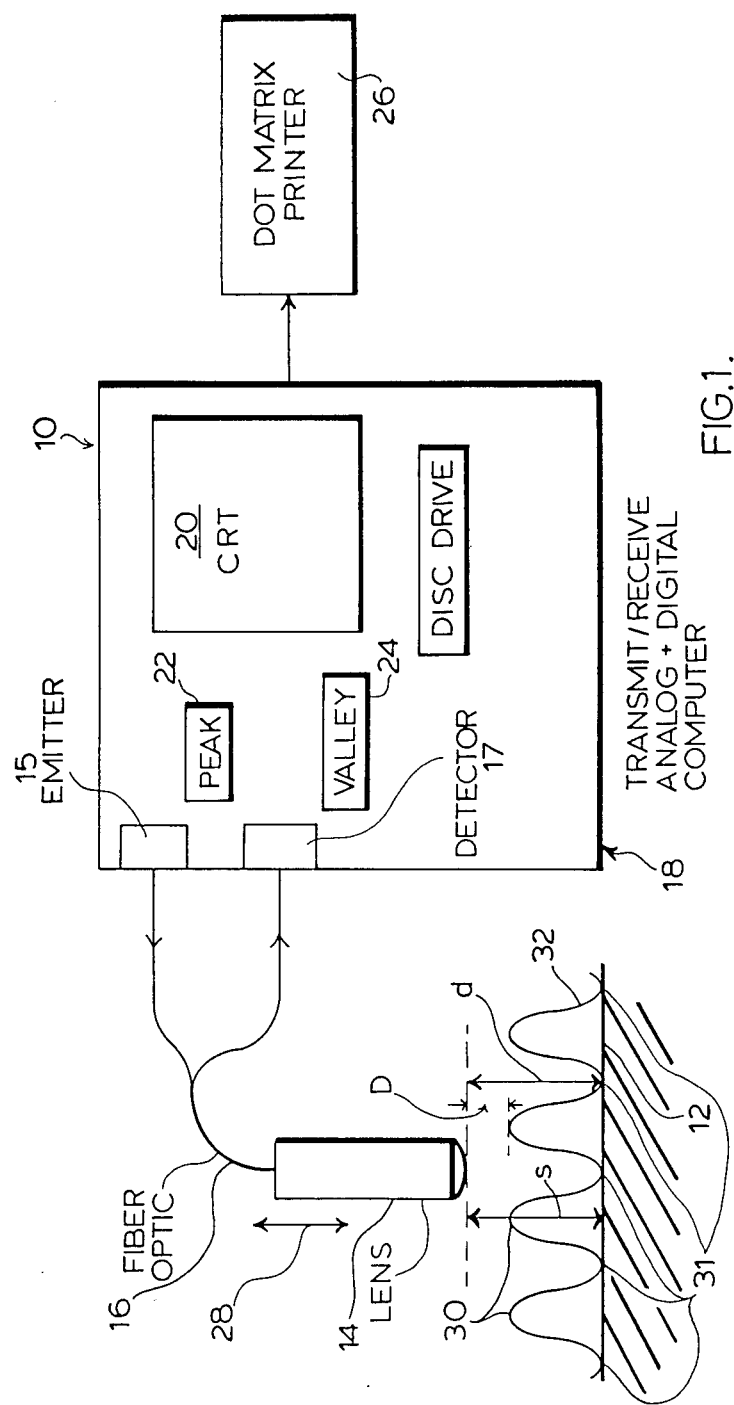
FIG. 1 is a schematic illustration of a sensor incorporating the present invention.

The measuring instrument of the present invention is schematically illustrated at 10 in FIG. 1. The measuring system includes a base or a reference surface 12, a lens system 14 spaced a predetermined distance S therefrom and adapted to project light from an emitter source 15 traveling through one branch of the bifuricated fiber optic 16 to the lens 14 that directs same as a beam toward a reference surface 12 so that the beam intersects the surface 12 at a substantial right angle, i.e. perpendicular to the tip of each flute and the base of each flute valley of the corrugated material.

The lens system 14 collects light reflected back towards the lens 14, i.e. parallel to the beam, and directs same by the other branch of the bifuricated fiber optics 16 to the detector 17.

The signal generated in the light detector is processed in the computer system generally indicated at 18 to determine peak levels of reflected light received by the lens 14 and the results may be displayed as digital values for the position of the flute tips or of the bases of the flute valleys as indicated by the displays 22 and 24 respectively and/or on a CRT tube 20. A print may be produced if desired on the printer 26.

The reference plane 12 functions to maintain the material to be examined in a specific position, i.e. at a specific distance from the lens system 14. The spacing therebetween which is designated as S may be adjustable as indicated by the arrow 28 to accommodate and calibrate for different sized corrugated material to be examined.

The terms flute tip is intended to define the point of maximum height of each flute and the term base of the valleys is intended to describe the lowermost point of each flute valley.

The operation of the system will be described in more detail hereinbelow, however, the distance D between the lens system 14 and the corrugated material 32 in effect determines the amount of light reflected back to the lens system and transmitted to the detector. Thus the distance D between the lens 14 and flute tips 30 is the closest the material 32 approaches the lens system 14 and thus generates a peak signal (maximum). Similarly, the depth of the corrugations, i.e. to the bases of the valleys 31, as indicated by the dimension d from the lens 14 to the base of the valleys also may be determined by determining the minimum amount of light reflected to the lens detector which generates a minimum signal voltage and projecting or estimating the distance d therefrom as will be described further hereinbelow.

A second peak signal (maximum) is generated at the bases of the valleys when the base of each valley traverses the beam as will be explained below.

Figure 2:
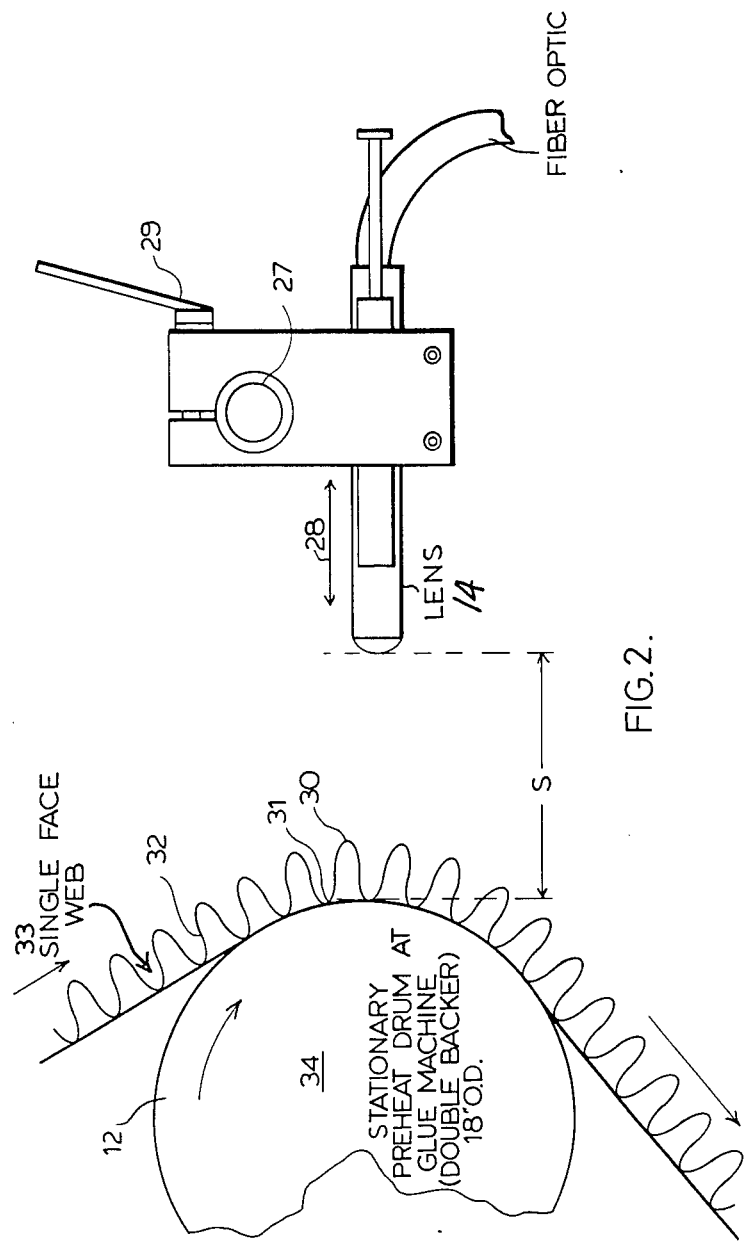
FIG. 2 shows the sensor head or lens mounted into position on a corrugating machine to measure the flute height of a single face.

In FIG. 2, the lens system has been shown in operative position on a corrugator directed at a single face web 33 as it travels over and is held by tension against the preheater drum 34 adjacent to the doublebacker in a conventional corrugator for making corrugated boxboard. In this arrangement, the axis of the lens is radial to the drum which in turn makes it radial to the curvature at the flute tip and at the base of each valley of the corrugations of the medium 32 of the single face 33 as it wraps the curved surface 34, i.e. perpendicular to the corrugated material (medium) at each flute tip and at the base of each valley. In this case, the distance S is the distance between the lens 14 and the surface of the preheat drum 34.

The lens system 14 is mounted on a cross-bar 27 so that its position across the machine may be changed by releasing the clamp 29 and moving the lens system along the bar 27 to another traverse position.

Figure 3:
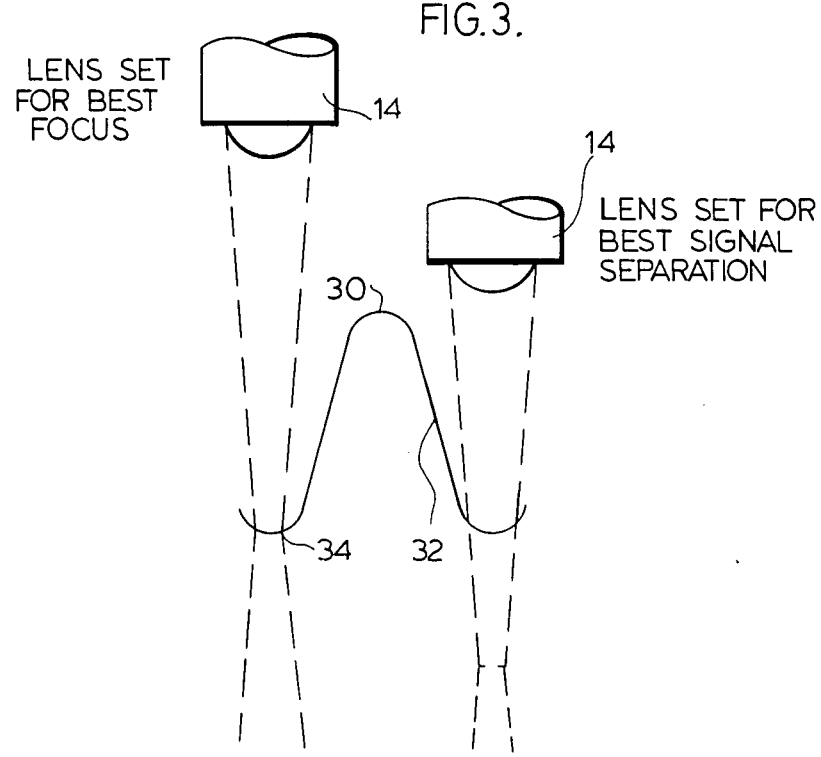
FIG. 3 provides a schematic illustration of the best location of the lens for proper operation.

The distance S of lens 14 from the reference surface is set to obtain the best signal separation between signal (voltage) peaks generated by the flute tips 30 and the bases of the valleys 31 of the corrugated material 32 rather than for the best focus on any particular point on the surface of the corrugations. FIG. 3, illustrates on the right a typical position for the lens 14 relative to the corrugated material 32 to obtain the best or maximum signal separation between the flute tips 30 and bases of the flute valleys 31. The best separation can be easily determined by calibrating using an oscilloscope to display the analog signal wave form of the voltage signal generated by the reflected light.

If the lens is set as indicated on the left hand side of FIG. 3 so that focus is best at the bases of the valleys 31 the light may be reflected back from the bases of the flute valleys 31 too strongly and may approach too closely the level of light reflected back from the flute tips 30 so that separation of signals indicating flute tips and the bases of the valleys may be difficult.

Figure 4:
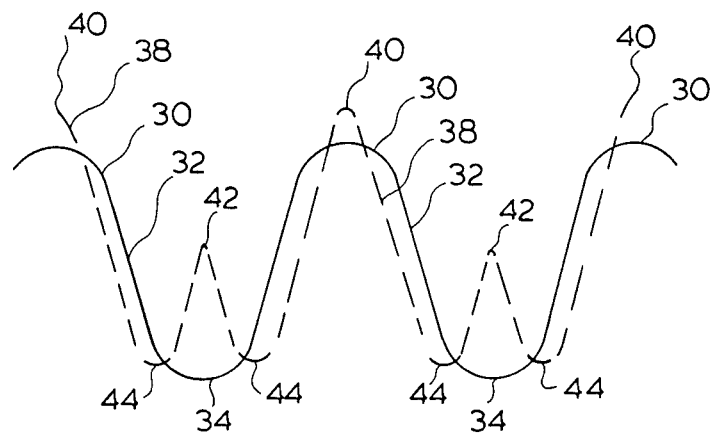
FIG. 4 is a schematic illustration of the signal generated and superimposed over the corrugated material being sensed.

FIG. 4, illustrates the signal generated with a lens set at position equivalent to that shown to the right in FIG. 3 so that the voltage signal generated from the reflected light as represented by the dash line 38 has the peak or maximum as indicated at 40 representative of the flute tip 30 of the corrugated material 32 and a second peak or maximum 42 representative of the base of the flute valley 31 for each of the corrugations with the minimum as indicated at 44 corresponding to the points of least reflection on each side of the base of the flute valley 31. These minimums 44 while not being directly representative of the base of each flute valley 31, do provide a sufficiently accurate and representative indication of the depth of the base of the flute valley 31 or the distance d as indicated in FIG. 1. The maximum signals 40 generated by the flute tips 30 are proportional or representative of the distance D between the flute tips 30 and the lens system 14.

The computer system and signal handling system 18 must be properly constructed to ensure that an accurate assessment is obtained.

The reflected light received from the flute tips and valleys by the detector generates voltages in the photo detector. These voltages are processed through flute peak and valley detection circuitry. The maxima voltages in a positive sense, represent flute tips 30, while the maxima in a negative sense (minima) represent the depth of the valleys as will be described hereinbelow.

Each maxima in a positive sense is registered in memory and the voltage is then allowed to dissipate at a rate not sufficiently quickly to intercept the peak generated by the light received from the base of the adjacent valley, yet sufficiently fast to intercept the upcoming peak representative of the flute tip 30 of the following flute, i.e. the decaying voltage in memory is reduced relative to the peak voltages sufficiently to intercept the next peak voltage representing the next flute tip.

Figure 5:
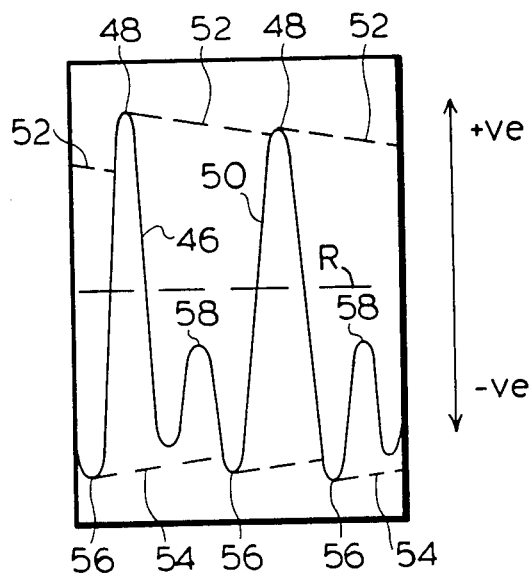
FIG. 5 is a schematic illustration of a typical signal having decay rates and reference signals superimposed thereon.
Figure 6:
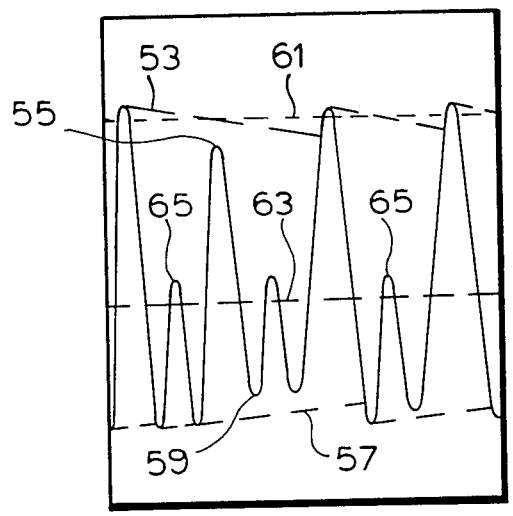
FIG. 6 is a view similar to FIG. 5 but illustrating decay rate settings and reference settings that would be ineffective.

FIG. 5, illustrates a preferred arrangement for the present invention wherein the voltages generated by the light received by the detector and represented by the line 46 passes through a maxima as indicated at 48 for the flute tip 30 of each flute of the corrugated material. This signal voltage above the decayed voltage is processed by the computer and the maxima detected as indicated at 48. It is then necessary that the maxima signal be decayed at the proper rate as above described so that the equipment is ready to receive the next voltage peak 50 which means that decay rate as indicated by the dotted line 52 is sufficient so that the voltage in the equipment has discharged to a level well below the voltage generated by the following flute tip as indicated at 50, i.e. the line 52 must intersect somewhere below the maximum 48 of peak 50, i.e. the voltage representative of the positive maximum must decay sufficiently rapidly that to ensure the next voltage peak generated by the next flute tip can be sensed, yet not so rapid as to intersect the voltage peak 58 generated by the base of the flute valley so that the valley might be interpreted as a flute tip. In FIG. 6, an arrangement of decay as indicated by the dash line 53 is not sufficiently rapid to carry out fully the intentions of the present invention. In the illustration the second voltage peak as indicated by the arrow 55 is below the decay line 53 so that the system would miss this voltage peak 55 representing the next flute tip and one of the flute tips 30 of the corrugated material would not be discovered or analyzed.

Similarly, the minimas are recorded and then must decay sufficiently quickly to ensure that the minima or the negative maximas decay sufficiently quickly to intercept the minima for each flute valley as shown in FIG. 5 via the lines 54 which intercept the minima 56 and permit detection thereof. The system automatically selects the lowest, i.e. most negative of the two negative peaks corresponding to each flute valley, e.g. as shown at 56 in FIG. 5 where the voltage decaying is indicated at 54.

FIG. 6 illustrates via the lines 57 an ineffective rate of decay for the minimum voltage. As can be seen this minimum has not decayed sufficiently to register the minimum as indicated at 59 so that the flute valley generating this particular voltage would not be sensed.

In order to differenciate between maximas and minimas, i.e. the positive peak and the negative peak, for insertion in memory, a reference voltage is applied to and compared with the voltage generated by the reflected light. This reference voltage is indicated by the letter R in FIG. 5 and will be positioned between the voltage peaks 48 representative of the voltage generated by the flute tips 30 and the voltage peaks 58 representative of the base of the flute valleys 31 of the corrugated material. Preferably the reference voltage R will be substantially midway between the voltage peaks 48 and 58. Obviously, if the reference voltage is too high as indicated for example the dotted line 61 in FIG. 6, it would completely miss the voltage peak 55 and information on the corresponding flute tip would not be transferred to memory, alternatively if the reference voltage was positioned as indicated by the dot dash line 63 it would erroneously interpret voltage peaks 65 as positive voltage peaks and include them in calculating the variation in flute tip height.

Figure 7:
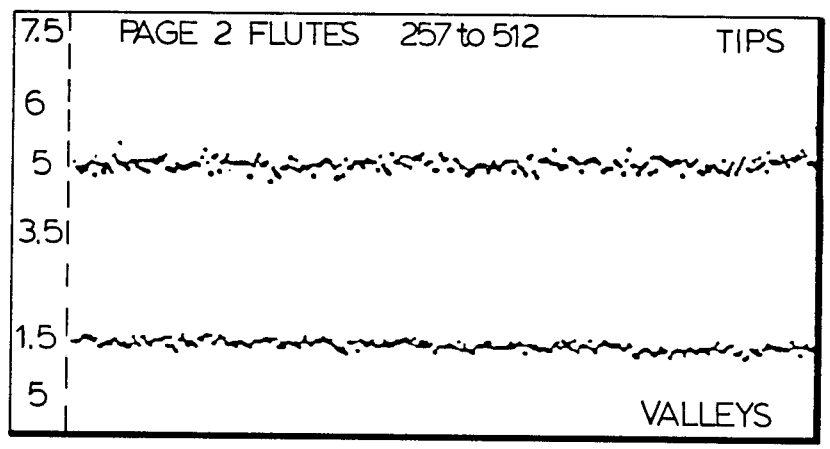
FIG. 7 is a dot matrix record of peaks and valleys sensed using the present invention.

In the arrangement of the present invention illustrated each maxima is represented by a dot and displayed as shown in FIG. 7, i.e. the positive maxima which indicate the flute tips 30 are plotted as indicated and designated as tips and the negative maxima which indicate the depth of base of the flute valleys may also be plotted as indicated and designated in FIG. 7 by the term valleys to provide an indication of the variation in flute height.

Figure 8:
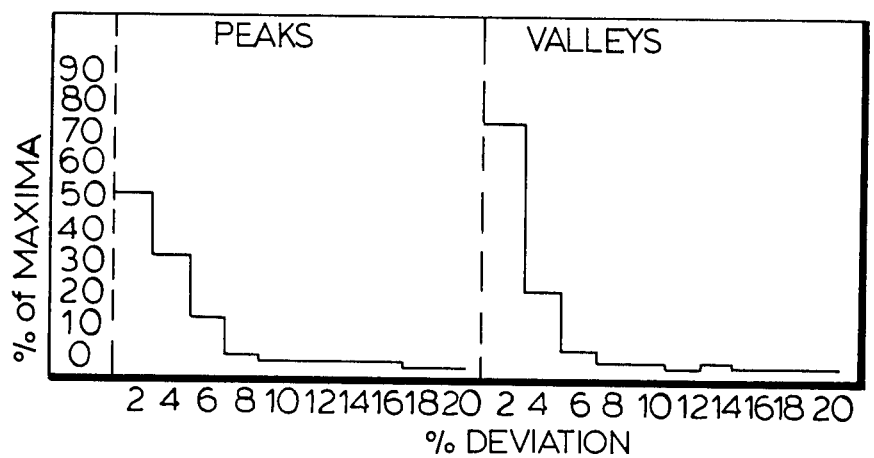
FIG. 8 is a plot of a statistical analysis of the dot matrix records of FIG. 7.

A statistical analysis or assessment of the plot shown in FIG. 7 is illustrated in FIG. 8 wherein the deviation is indicated on the horizontal axis while the vertical axis indicates the percent of maximas with the plotted deviation. For example, the tips represented in graph of FIG. 8 shows that about 50% of the tips deviated by 3% or less, 30% deviated by between 3%-5%, about 15% deviated between 5%-7%, and there were minor numbers of deviations above these percentage. The percent deviations are based on the averages calculated for a selected number of voltage peaks. In the case illustrated in FIG. 7 there are 256 voltage maxima and minima determined per frame and used for averaging. In this manner selected consecutive groups of positive and negative maxima may be averaged.

Figure 9:
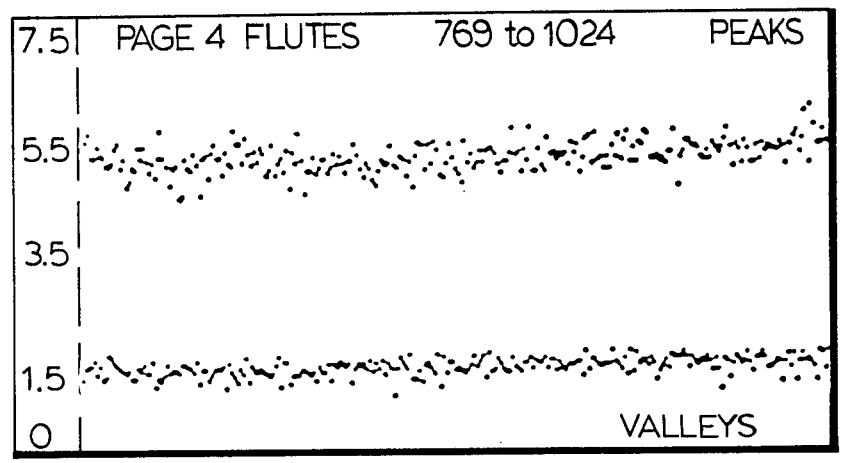
FIG. 9 is a view similar to FIG. 7 but illustrating a different fluted medium with a greater variation especially in the peaks of the flutes.
Figure 10:
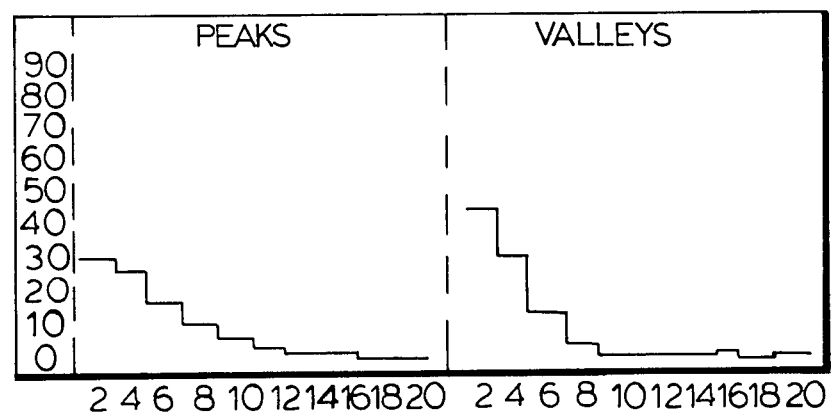
FIG. 10 is a plot of a statistical analysis of the dot matrix printout of FIG. 9.

FIGS. 9 and 10 are similar to FIGS. 7 and 8 but illustrate a less uniform flute profile. For example, only about 30% of the flute tips at the minimum deviation of between 0%-3% as compared with the over 50% illustrated in FIG. 8.

In the illustrated arrangement the voltage representative of the flute tips and bases of the flute valleys of the corrugated material both have been obtained and the height of the peaks determined by the differences between these detected maxima and minima, thus the precise distance between the lens system 14 and the reference surface 12 is not essential. However, if desired the distance S may be incorporated into the algorithm which will permit detecting the height (depth) of the flute tips (bases of the valleys) independently.

It will be apparent that the voltages generated may be used to determine the uniformity of the flute height and may be used to control the corrugator or to determine the suitably of a medium or the manner in which the medium is being converted on the corrugator, e.g. the effect of operating variables such as steam application, corrugator roll pressure, heat and medium tension.

The electronics and signal processing with proper tuning of the decaying signal can detect and analyze every flute of the corrugated medium traversing the light beam at full operating machine speeds.

It is preferred to use a specific band width infrared light as the light source and to only detect this light. This ensures maximum tolerance to ambient conditions and variations in medium such as color. Infrared photo emitters and detectors are relatively readily available.

Having described the invention, modifications will be evident to those skilled in the art without departing from the spirit of the invention as defined in the appended claims.

I claim:

1. A method of determining the variation in height of a flute profile of a corrugated material having curved alternating flute tips and valleys comprising passing the corrugated medium in a predetermined space relationship past a beam of light, said beam being directed substantially perpendicularly to each said flute tip and the base of each said flute valley as said tips and valleys traverse said beam, collecting light reflected back from said corrugated medium substantially parallel to said beam and generating voltages representative of said light collected, determining the maxima of said voltages to provide a series of positive maximas the values of which are representative of the relative heights of said tips of said corrugated material.

2. A method as defined in claim 1 wherein said maxima are representative of a positive voltage higher than a preset voltage.

3. A method as defined in claim 2 wherein negative maxima voltages are generated, at least one negative maxima from adjacent the base of each said valley, said at least one negative maxima voltages of said maxima negative voltages providing an indication of the depth of the bases of their respective said valleys.

4. A method as defined in claim 3 further comparing applying a reference voltage to said generated voltage said reference voltage differentiating said positive maxima from said negative maxima.

5. A method as defined in claim 3 when said heights of said flute tips are determined by the difference between said positive maxima and said negative maxima.

6. An apparatus as defined in claim 4 wherein said detector further comprises means for detecting negative maxima voltages each representative of a maximum negative voltage relative to a preselected reference voltage thereby to provide an indication of the depths of said bases of said flute valleys.

7. An apparatus as defined in claim 4 wherein said reference surface is a covex curved surface and wherein said beam is directed substantially radially relative to said surface.

8. A method as defined in claim 5 wherein selected consecutive groups of at least one of said positive and negative maxima are averaged.

9. An apparatus as defined in claim 8 wherein said lens system includes an emitter and collector and lens and wherein said lens is spaced from said reference surface so that the amount of light reflected parallel to said beam from said flute tips is significantly greater than the amount of light reflected from the bases of said flute valleys.

10. An apparatus as defined in claim 9 wherein said lens system include a bifuricated fiber optic system connecting said lens with said emitter and said collector.

11. An apparatus for determining the variation and height of a flute profile of a corrugated material having alternative curved flute tips and valleys comprising a reference surface, means for maintaining one side of said corrugated material in predetermined relationship to said reference surface while moving said corrugated material relative to a lens system, said lens system being spaced a preset distance from said reference surface and being adapted to project a beam of light onto said corrugated material in a direction substantially perpendicular to flute tips and bases of said valleys and substantially perpendicular to said reference surface, means for collecting light reflected from said corrugated material in a direction opposite to and substantially parallel to said beam, detector means for detecting the maxima of said collected light higher than a selected value to provide a series of positive maxima voltages the value of which are representative of the spacing between the said crests of said flute tips and said lens system thereby to determine the height of said flute tips.

* * * * *